United States Patent
Takada et al.

(10) Patent No.: US 9,592,877 B2
(45) Date of Patent: Mar. 14, 2017

(54) SADDLE-RIDDEN TYPE FUEL CELL VEHICLE

(71) Applicant: SUZUKI MOTOR CORPORATION, Hamamatsu-shi, Shizuoka (JP)

(72) Inventors: Shinichiro Takada, Hamamatsu (JP); Toru Eguchi, Hamamatsu (JP); Kazuyuki Hirota, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/069,392

(22) Filed: Mar. 14, 2016

(65) Prior Publication Data
US 2016/0280305 A1 Sep. 29, 2016

(30) Foreign Application Priority Data
Mar. 24, 2015 (JP) ................. 2015-060791

(51) Int. Cl.
*B62K 11/10* (2006.01)
*B62M 7/00* (2010.01)
*B60L 11/18* (2006.01)
*B62J 35/00* (2006.01)

(52) U.S. Cl.
CPC ........... *B62K 11/10* (2013.01); *B60L 11/1896* (2013.01); *B62J 35/00* (2013.01); *B62M 7/00* (2013.01)

(58) Field of Classification Search
CPC ..... B60K 1/04; B60K 7/0007; B60L 11/1896; B60L 2200/12; B62K 11/00; B62K 11/10; B62K 2202/00; B62M 7/00; B62M 7/12
See application file for complete search history.

(56) References Cited

U.S. PATENT DOCUMENTS

| | | | | |
|---|---|---|---|---|
| 7,121,366 | B2* | 10/2006 | Horii | B60L 11/1881 180/220 |
| 8,479,857 | B2* | 7/2013 | Tamura | B60K 1/04 180/291 |
| 8,485,299 | B2* | 7/2013 | Iida | H01M 16/006 180/219 |
| 8,622,163 | B2 | 1/2014 | Eguchi et al. | 180/68.5 |
| 2010/0252554 | A1* | 10/2010 | Eguchi | B60K 1/04 220/86.2 |
| 2010/0294582 | A1 | 11/2010 | Eguchi et al. | 180/220 |

(Continued)

FOREIGN PATENT DOCUMENTS

JP 2010-269269 A 12/2010

*Primary Examiner* — Joseph Rocca
*Assistant Examiner* — Michael Stabley
(74) *Attorney, Agent, or Firm* — Stein IP, LLC

(57) ABSTRACT

There is provided a saddle-ridden type fuel cell vehicle. The fuel cell vehicle includes: a body frame; a steerable wheel; a driving wheel; a motor; a fuel cell; a fuel tank; and a tank valve. The body frame includes: a head pipe; a down frame portion; a pair of upper main frame portions; a pair of lower main frame portions; and up frame portions. A tank placement portion is formed in a region encircled by the upper main frame portions and the lower main frame portions in the middle portion of the body frame in the front and rear direction. The fuel tank is placed on the tank placement portion so that an axis thereof extends in the front and rear direction. A guard frame is installed between the up frame portions to traverse the rear of the tank valve in a right and left direction.

6 Claims, 8 Drawing Sheets

(56) References Cited

U.S. PATENT DOCUMENTS

| | | | | |
|---|---|---|---|---|
| 2013/0302713 | A1* | 11/2013 | Yamamoto | H01M 8/04201 429/442 |
| 2014/0353061 | A1* | 12/2014 | Iida | B60K 15/07 180/220 |
| 2016/0056482 | A1* | 2/2016 | Otsuka | B60L 11/1898 180/220 |
| 2016/0121964 | A1* | 5/2016 | Nagaya | B62M 7/12 180/220 |

* cited by examiner

SADDLE-RIDDEN TYPE FUEL CELL VEHICLE

CROSS-REFERENCE TO RELATED APPLICATIONS

The disclosure of Japanese Patent Application No. 2015-060791 filed on Mar. 24, 2015, including specification, drawings and claims is incorporated herein by reference in its entirety.

TECHNICAL FIELD

The present invention relates to a saddle-ridden type fuel cell vehicle running by driving a motor with an electric power from a fuel cell.

BACKGROUND

Such a saddle-ridden type fuel cell vehicle is disclosed, for example, in Patent Document 1 as described below. In the saddle-ridden type fuel cell vehicle, a handle and a steerable wheel are provided on a front portion of a body frame, a driving wheel is provided on a rear portion of the body frame via a swingable arm, and also a motor for driving the driving wheel is provided on the swingable arm. Also, a seat is provided on an upper side of the middle portion of the body frame in a front and rear direction thereof and a fuel cell for supplying an electric power to the motor is provided on an upper side of the rear portion of the body frame. In addition, a fuel tank for storing a fuel for the fuel cell is provided on a lower side of the middle portion of the body frame in the front and rear direction, and a tank valve (valve unit) for controlling supplying of the fuel from the fuel tank to the fuel cell is provided behind the fuel tank on the lower side of the middle portion of the body frame in the front and rear direction.

Also, in the saddle-ridden type fuel cell vehicle described in Patent Document 1, the fuel tank has a generally cylindrical exterior shape and is arranged so that an axis thereof is laid down to extend along the front and rear direction of the vehicle. Further, the body frame of the saddle-ridden type fuel cell vehicle includes a pair of right and left upper frames extending in the front and rear direction and a pair of right and left lower frames positioned below the upper frames and extending in the front and rear direction. The fuel tank is arranged in a center tunnel region encircled by the upper frames and the lower frames and is supported on the upper frames and the lower frames by a pair of tank bands (ring-shaped clamps). In addition, a guard frame is provided below a rear portion of the fuel tank and below the tank valve. The guard frame is installed between the pair of right and left lower frames.

Upon a side collision, a load is exerted on the saddle-ridden type fuel cell from a lateral side thereof. The upper frames and the lower frames encircling the fuel tank receive the load exerted from the lateral side to inhibit the load from being exerted on the fuel tank, thereby protecting the fuel tank.

In addition, upon running, a stone on a road is likely to be bounced and hit against a lower portion of the vehicle, or a protrusion of uneven road surface is likely to hit against the lower portion of the vehicle. The guard frame provided below the tank valve receives the bounced stone or the protrusion of the road surface to inhibit the bounced stone or the protrusion of the road surface from hitting against the tank valve, thereby protecting the tank valve.

Meanwhile, in Patent Document 1, it is mentioned that when the fuel tank is mounted on the saddle-ridden type fuel cell vehicle, the fuel tank can be mounted into the center tunnel region by causing the fuel tank to pass between the pair of lower frames from the lower side thereof, and as a result, maintenance thereof is enhanced.

Further, in the saddle-ridden type fuel cell vehicle described in Patent Document 1, the fuel tank is fixed on the upper frames and the lower frames by the tank band after the fuel tank is mounted into the center tunnel region from the lower side of the saddle-ridden type fuel cell vehicle. In order to realize such a mounting operation, the tank band is divided into an upper half portion and a lower half portion, and also the upper half portion is previously fixed between the upper frames and the lower frames and the lower haft portion is configured to be connectable to the upper half portion by fastener members. Upon a mounting operation of the fuel tank, after the fuel tank is mounted into the center tunnel region from the lower side of the saddle-ridden type fuel cell vehicle, the fuel tank is clamped by connecting the upper half portion and the lower half portion to each other by the fastener members while sandwiching the fuel tank between the upper half portion and the lower half portions, and then by tightening the fastener members. Thus, the fuel tank is fixed on the upper frames and the lower frames.

[Patent Document 1] Japanese Patent Application Publication No. 2010-269659A

However, upon a frontal or rear-end collision, a load is exerted on the saddle-ridden type fuel cell vehicle from a front or rear side thereof. As a result, the front wheel or the rear wheel is likely to be abnormally displaced rearward or forward, respectively. In particular, upon a rear-end collision, it is considered that the swingable arm together with the rear wheel is pressed forward and thus is excessively deformed forward to exceed a normal swing range about a pivot.

In the saddle-ridden type fuel cell vehicle described in Patent Document 1, the fuel tank and tank valve are arranged between the front wheel and the rear wheel, and the guard frame installed on bent portions of rear portions of the lower frames extends up to below the tank valve. Meanwhile, in the saddle-ridden type fuel cell vehicle, no frame is provided behind the tank valve arranged on the rear side of the tank valve. Thus, if the swingable arm and the rear wheel is excessively swung forward due to a frontal or rear-end collision, the swingable arm or the rear wheel hits against the guard frame so that an impact is absorbed and thus further swing thereof is blocked. However, if the swingable arm and the rear wheel are excessively deformed to exceed an anticipated range, the swingable arm or the rear wheel is likely to enter above the guard frame so that the swingable arm or the rear wheel can directly hit against the tank valve.

Also, when the swingable arm the rear wheel are excessively deformed forward due to a frontal or rear-end collision and thus directly hit against the tank valve, a load is exerted on the rear portion of the fuel tank via the tank valve. A direction of the load is varied depending on a direction, along which the swingable arm or the rear wheel directly hits against the tank valve or the like, and thus, for example, is likely to be a forward-oblique upward direction, a forward-oblique downward direction, a forward-oblique right direction or a forward-oblique left direction. Because the fuel tank is arranged so that the axis thereof is oriented in a front and rear horizontal direction, if a load is exerted on the rear portion of the fuel tank in a forward-oblique upward direction, a forward-oblique downward direction, a forward-oblique right direction or a forward-oblique left direction, the direction of the load corresponds to a direction intersecting the axis of the fuel tank. Due to having a generally cylindrical exterior shape and the like, the fuel tank is hardly deformed by a load exerted in a direction along the axis, but relatively easily deformed in a load exerted in a direction intersecting the axis. Accordingly, the load exerted in a direction intersecting the axis of the fuel tank is an unfavorable load to the fuel tank. Thus, if the swingable arm the rear wheel are excessively deformed forward due to a frontal or rear-end collision and thus directly hit against the tank valve, such an unfavorable load is likely to be exerted on the fuel tank. Therefore, it is desired to inhibit such a load in order to protect the fuel tank.

Further, there is a possibility that the upper frames are displaced due to an impact upon a frontal or rear-end collision and thus a positional relationship between the upper frame and the lower frames are changed. In this case, in the saddle-ridden type fuel cell vehicle described in Patent Document 1, the tank band (upper half portion) for fixing the fuel tank is fixed on both of the upper frames and the lower frames, and thus the tank band is easily deformed. If the tank band is deformed, a load is likely to be exerted on the fuel tank via the tank band. Accordingly, it is desired to inhibit such a load in order to protect the fuel tank.

Further, in the saddle-ridden type fuel cell vehicle described in Patent Document 1, there is a possibility that portions of the pair of right and left upper frames, which are positioned above the middle portion of the fuel tank in the front and rear direction, are deformed in directions approaching each other due to an impact upon a frontal or rear-end collision and thus a load is exerted on the fuel tank due to such deformation. Accordingly, it is desired to inhibit such a load in order to protect the fuel tank.

Meanwhile, in the saddle-ridden type fuel cell vehicle described in Patent Document 1, the fuel tank can be mounted in the center tunnel region by causing the fuel tank to pass between the pair of lower frames from the lower side of the vehicle. Accordingly, a diameter of the fuel tank has to be smaller than a dimension, in the right and left direction, of a space defined between the pair of lower frames. As a result, the diameter of the fuel tank is limited and thus it is difficult to increase a capacity of the fuel tank. In practice, because the fuel tank is mounted in the center tunnel region by causing the fuel tank to pass between the pair of lower frames after members such as brackets are attached on an outer periphery of the fuel tank, the diameter of the fuel tank needs to be set in consideration of dimensions of members such as brackets. Accordingly, the diameter of the fuel tank is further limited and thus it is further difficult to increase a capacity of the fuel tank.

SUMMARY

It is therefore a first object of the present invention to provide a saddle-ridden type fuel cell vehicle in which protection of a tank valve and a fuel tank upon a frontal or rear-end collision can enhanced.

A second object of the present invention is to provide a saddle-ridden type fuel cell vehicle in which a diameter of a fuel tank can be increased and thus a capacity of the fuel tank can increased.

According to an aspect of the embodiments of the present invention, there is provided a saddle-ridden type fuel cell vehicle, comprising a body frame; a steerable wheel provided on a front portion of the body frame; a driving wheel provided on a rear portion of the body frame via a swingable arm; a motor provided on the swingable arm to drive the driving wheel; a fuel cell provided on the body frame to supply an electric power to the motor; a fuel tank having a generally cylindrical exterior shape and provided below a middle portion of the body frame in a front and rear direction thereof to store a fuel for the fuel cell; and a tank valve provided behind the fuel tank below the middle portion of the body frame in the front and rear direction to control supplying of the fuel from the fuel tank to the fuel cell, wherein the body frame comprises: a head pipe positioned on a front portion of the saddle-ridden type fuel cell vehicle and configured to support the steerable wheel; a down frame portion extending downward from the head pipe; a pair of right and left upper main frame portions extending in the front and rear direction from a portion of the down frame portion, which is located at the approximately middle thereof in an upward and downward direction, to a rear portion of the saddle-ridden type fuel cell vehicle; a pair of right and left lower main frame portions extending in the front and rear direction from a lower portion of the down frame portion to the middle portion of the saddle-ridden type vehicle in the front and rear direction; and up frame portions respectively extending upward from rear end portions of the pair of lower main frame portions and respectively connected to the pair of upper main frame portions at upper end portions thereof; wherein a tank placement portion is formed in a region encircled by the pair of upper main frame portions and the pair of lower main frame portions in the middle portion of the body frame in the front and rear direction, and the fuel tank is placed on the tank placement portion so that an axis thereof extends in the front and rear direction; wherein a guard frame is installed between the up frame portions to traverse the rear of the tank valve in a right and left direction.

According to the present invention, the guard frame is installed between the pair of up frame portions to traverse the rear of the tank valve in the right and left direction. Therefore, if the swingable arm or the rear wheel is excessively swung or deformed forward to exceed a normal swing range due to a frontal or rear-end collision, the swingable arm or the rear wheel hits against the guard frame. Thus, upon a frontal or rear-end collision, the swing arm or the rear wheel can be prevented from directly hitting against the tank valve, thereby enhancing protection of the tank valve.

In the saddle-ridden type fuel cell vehicle, the guard frame may be formed as a member independent of the body frame, guard frame-side attaching portions for attaching the guard frame on the pair of up frame portions may be provided on both end portions of the guard frame, each of the up frame portions may be provided with an up frame-side attaching portion, on which the respective guard frame-side attaching portions of the guard frame are to be attached, and each of the guard frame-side attaching portions may be fixed to the respective up frame-side attaching portion by a fastener member.

According to the above aspect of the present invention, in a step prior to mounting the fuel tank into the tank placement portion, the guard frame is left separated from the body frame and then after mounting the fuel tank into the tank placement portion, the guard frame can be attached onto the body frame. The guard frame is attached on the up frame portions of the body frame and covers the fuel tank and the tank valve on the rear side thereof. Accordingly, when the guard frame has been attached on the up frame portions, the rear of the tank placement portion is closed by the guard frame. On the other hand, in a step prior to attaching the guard frame on the up frame portions, the rear of the tank placement portion is opened and thus the fuel tank can pass through the opened portion. Therefore, in the step prior to attaching the guard frame on the up frame portions, the fuel tank and the tank valve can be moved forward from the rear of the saddle-ridden type fuel cell vehicle in a generally horizontal direction to be mounted into the tank placement portion.

In this way, the fuel tank can be put into the tank placement portion from the rear thereof. Accordingly, a diameter of the fuel tank (when members such as brackets have been attached to the fuel tank, a diameter of the entire structure including the fuel tank and the members such as brackets) can be set to be larger than a dimension in the right and left direction of a space defined between the pair of lower main frame portions arranged below the axis of the fuel tank at a location corresponding to the tank placement portion, a dimension in the right and left direction of a space defined between the pair of upper main frame portions arranged above the axis of the fuel tank, a dimension in the upward and downward direction of a space defined between the upper main frame portions and the lower main frame portion arranged on the left side of the axis of the fuel tank, or a dimension in the upward and downward direction of a space defined between the upper main frame portions and the lower main frame portion arranged on the right side of the axis of the fuel tank. As a result, a diameter of the fuel tank can be increased and thus a capacity of the fuel tank can be increased.

In the saddle-ridden type fuel cell vehicle, the guard frame may comprise: an upper guard frame extending between the pair of up frame portions in the right and left direction and intersecting the axis of the fuel tank; a lower guard frame positioned below the upper guard frame and extending between the pair of up frame portions in the right and left direction; and a connection member for connecting the upper guard frame and the lower guard frame to each other, and the guard frame-side attaching portions may be respectively provided on both end portions of the upper guard frame and on both end portions of the lower guard frame.

According to the above aspect of the present invention, when the swingable arm or the rear wheel is excessively swung or deformed forward to exceed a normal swing range due to a frontal or rear-end collision, the swingable arm or the rear wheel hits against the upper guard frame. Thus, the swing arm or the rear wheel can be prevented from directly hitting against the tank valve, thereby enhancing protection of the tank valve.

Also, for example, when the frontal or rear-end collision is very severe, the swingable arm or the rear wheel excessively swung or deformed forward to exceed the normal swing range very intensively hits against the upper guard frame. Accordingly, it is considered that the upper guard frame is displaced forward and thus the upper guard frame hits against the rear portion of the tank valve so that a load is exerted onto the fuel tank via the tank valve. In this case, because the upper guard frame is positioned to intersect the axis of the fuel tank, a direction of the load exerted on the rear portion of the fuel tank via the upper guard frame and the tank valve often becomes a direction along the axis of the fuel tank. Due to having a generally cylindrical exterior shape and the like, the fuel tank is hardly deformed in a case where the load is exerted thereon in the direction along the axis, as compared with a case where the load is exerted in a direction intersecting the axis. Thus, when a very severe frontal or rear-end collision occurs, a direction of an impact load becomes a direction along the axis of the fuel tank due to the upper guard frame, thereby inhibiting deformation of the fuel tank. In this way, protection of the fuel tank can be enhanced.

Further, the lower guard frame can prevent a stone bounced from a road surface or a protrusion on an uneven road during running from directly hitting against the tank valve, thereby enhancing protection of the tank valve. In addition, the lower guard frame reinforces the upper guard frame connected thereto via the connection members. Thus, protection of the fuel tank can be enhanced.

Also, the guard frame is a unitary structure in which the upper guard frame and the lower guard frame are connected to each other by the connection member. Thus, when the fuel tank is mounted onto the body frame, a structure of covering the fuel tank and the tank valve on the rear side thereof and also covering the tank valve on the lower side thereof in the saddle-ridden type fuel cell vehicle can be easily realized by only attaching the guard frame, which is the unitary structure, on the up frame portions after mounting the fuel tank into the tank placement portion from the rear thereof.

In the saddle-ridden type fuel cell vehicle, the upper guard frame may be formed in a generally U shape as viewed from an upper side thereof, and at least the tank valve may be arranged inside of the upper guard frame.

According to the above aspect of the present invention, the upper guard frame can cover the lateral sides of the tank valve as well as the rear side thereof, thereby enhancing protection of the tank valve. In addition, pipes connected to the tank valve and arranged on the lateral sides of the tank valve can be also protected by the upper guard frame.

In the saddle-ridden type fuel cell vehicle, a bridge frame may be provided on a lower end portion of the down frame portion to traverse the front of the fuel tank, a tank bracket opposing a front end portion of the fuel tank may be fixed on the bridge frame, and the tank bracket may be positioned at a position intersecting the axis of the fuel tank.

According to the above aspect of the present invention, the tank bracket opposing the front end portion of the fuel tank is fixed on the bridge frame traversing the front of the fuel tank and the tank bracket is positioned at a position intersecting the axis of the fuel tank. Accordingly, upon a frontal or rear-end collision, the tank bracket can receive a load exerted from the front of the fuel tank so that a direction of the load becomes a direction along the axis of the fuel tank. Thus, deformation of the fuel tank can be inhibited and protection of the fuel tank can be enhanced.

The saddle-ridden type fuel cell vehicle may further comprise a band-shaped tank support member for supporting the fuel tank on the body vehicle by clamping an outer periphery of the fuel tank, and the tank support member may be fixed to only the lower main frame portions.

Due to the structure of the saddle-ridden type fuel cell vehicle, the lower main frame portions are arranged to have a large distance therebetween in the right and left direction and also to extend in a straight line shape in the front and rear direction of the vehicle. On the other hand, the upper main frame portions have a distance therebetween in the right and left direction narrower than the distance of the lower main frame portions in the right and left direction and thus often have to be bent. Accordingly, the upper main frame portions have a strength lower than those of the lower main frame portions. Thus, when an impact upon a frontal or rear-end collision is exerted, it is considered that the lower frame portions are kept in an original shape, but the upper frame portions are deformed. According to the above aspect of the present invention, the tank support member is fixed to only the lower main frames, namely, is already separated from the upper main frames. As a result, the fuel tank is supported on only the lower main frame portions via the tank support member. Thus, even if the upper main frame portions are deformed due to an impact upon a frontal or rear-end collision, a load to be exerted on the fuel tank can be inhibited so long as the lower main frame portions are kept in an original shape. Also, even if positions of the upper main frame portions are displaced relative to positions of the lower main frame portions due to deformation of the upper main frame portions and the like, the tank support member is not deformed in accordance with displacement of the upper main frame portions because the tank support portion is separated from the upper main frame portions. Accordingly, it is possible to prevent a load from being exerted on the fuel tank due to deformation of the tank support member.

In the saddle-ridden type fuel cell vehicle, a reinforcing bridge frame may be installed between the pair of upper main frame portions above the middle portion of the fuel tank in the front and rear direction.

According to the above aspect of the present invention, the upper main frame portions above the middle portion of the fuel tank in the front and rear direction can be inhibited from being deformed upon a frontal or rear-end collision, and also the upper main frame portions can be effectively reinforced. Therefore, it is possible to prevent a load from being exerted on the fuel tank due to deformation of the upper main frame portions, thereby inhibiting deformation of the fuel tank.

According to aspects of the present invention, protection of the tank valve and the fuel tank upon a frontal or rear-end collision can enhanced. Also, according to aspects of the present invention, a diameter of the fuel tank can be increased and thus a capacity of the fuel tank can increased.

DETAILED DESCRIPTION OF THE EMBODIMENTS

Figure 1:
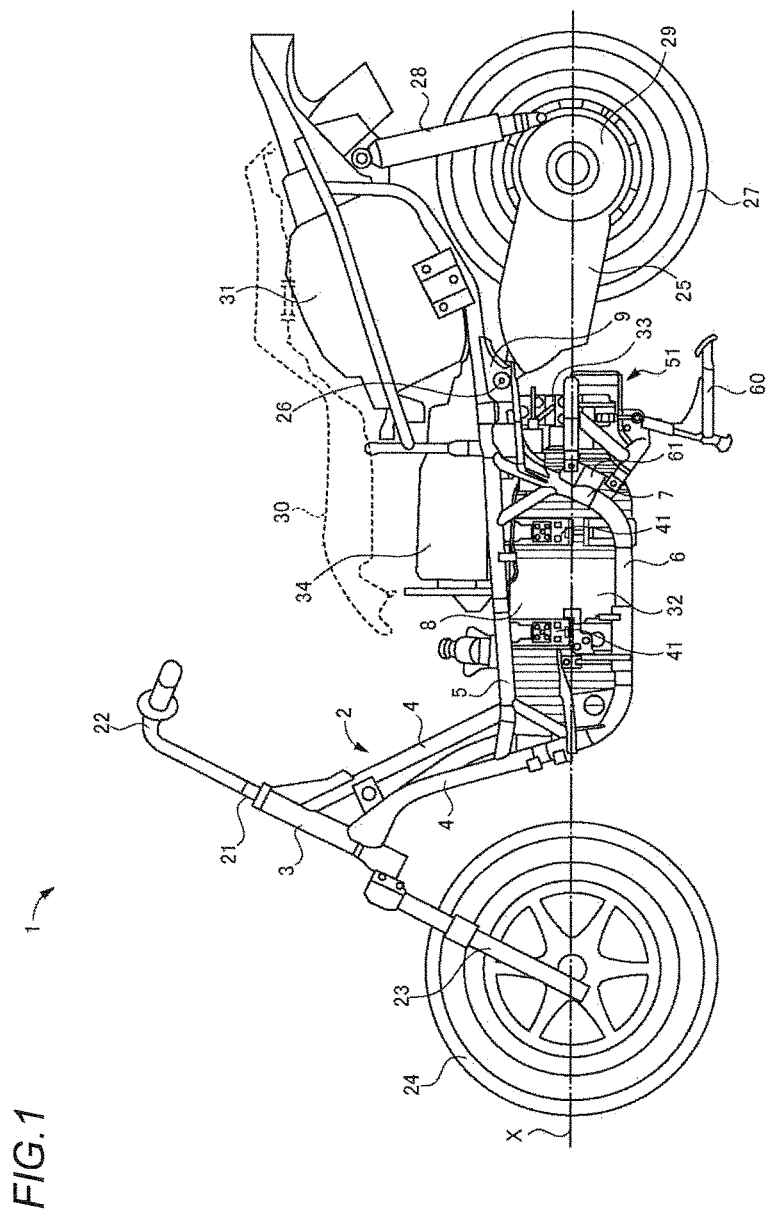
FIG. 1 is an explanatory view showing a saddle-ridden type fuel cell vehicle according to an embodiment of the present invention.
Figure 2:
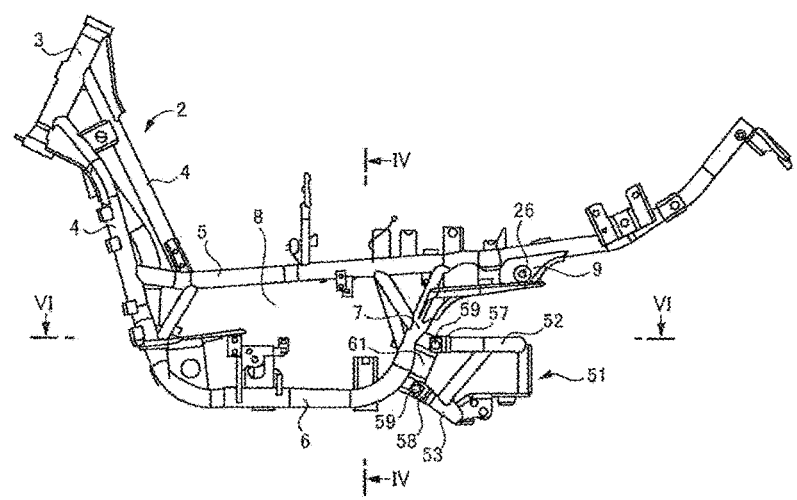
FIG. 2 is an explanatory view showing a body frame and a guard frame of the saddle-ridden type fuel cell vehicle according to the embodiment of the present invention, as viewed from the lateral side.
Figure 3:
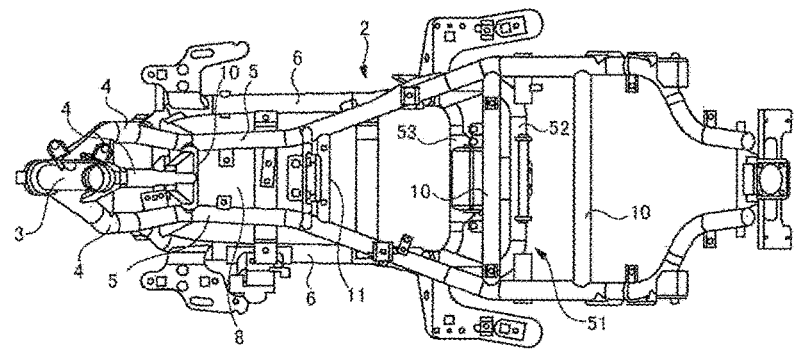
FIG. 3 is an explanatory view showing the body frame and the guard frame of the saddle-ridden type fuel cell vehicle according to the embodiment of the present invention, as viewed from the upper side.

FIG. 1 is an explanatory view showing a saddle-ridden type fuel cell vehicle according to an embodiment of the present invention. FIG. 2 is an explanatory view showing a body frame and a guard frame of the saddle-ridden type fuel cell vehicle, as viewed from the lateral side. FIG. 3 is an explanatory view showing the body frame and the guard frame of the saddle-ridden type fuel cell vehicle, as viewed from the upper side. Meanwhile, in the following description, each of front, rear, left, right, upward and downward directions refers to front, rear, left, right, upper and lower sides relative to a driver sat on a seat of the saddle-ridden type fuel cell vehicle 1.

In FIG. 1, the saddle-ridden type fuel cell vehicle 1 is a saddle-ridden type vehicle running by driving a motor with an electric power from a fuel cell. The saddle-ridden type fuel cell vehicle 1 is, for example, a scooter-type automatic two-wheeled vehicle. Meanwhile, in FIG. 1, the exterior of the saddle-ridden type fuel cell vehicle 1 is omitted for convenience of explanation.

The saddle-ridden type fuel cell vehicle 1 has a body frame 2 constituting a skeleton thereof. The body frame 2 is formed by connecting a plurality of pipe-shaped members made of steel, aluminum alloy and the like by welding or the like. As shown in FIG. 2 or 3, the body frame 2 includes a head pipe 3, a plurality of down frame portions 4, a pair of upper main frame portions 5, a pair of lower main frame portions 6, and a pair of up frame portions 7.

The head pipe 3 is positioned on a front portion of the saddle-ridden type fuel cell vehicle 1. Each of down frame portions 4 is configured to extend downward from the head pipe 3. The pair of upper main frame portions 5 are respectively arranged on left and right sides of the saddle-ridden type fuel cell vehicle 1 and are configured to extend from middle portions of the down frame portions 4 in an upward and downward direction to a rear portion of the saddle-ridden type fuel cell vehicle 1 along a front and rear direction. The pair of lower main frame portions 6 are respectively arranged on left and right sides of the saddle-ridden type fuel cell vehicle 1 and are configured to extend from lower portions of the down frame portions 4 to the middle portion, in a front and rear direction, of the saddle-ridden type fuel cell vehicle 1 along the front and rear direction. The pair of up frame portions 7, as shown in FIG. 2, are configured to respectively extend upward from rear ends of the pair of lower main frame portions 6 and to be respectively connected to the pair of upper main frame portions 5 at upper ends thereof. Also, a tank placement portion 8 on which a fuel tank 32 is placed is formed in a region encircled by the pair of upper main frame portions 5 and the pair of lower main frame portions 6 below the middle portion of the saddle-ridden type fuel cell vehicle 1 in the front and rear direction. Further, in the body frame 2, swingable arm support portion 5 for supporting a swingable arm 25 are respectively formed on a rear portion of each upper main frame portion 5 or an upper end-side portion of each up frame portion 7. The swingable arm support portion 5 are positioned above and behind each up frame-side attaching portion 61 as described below. Also, a swingable arm support portion 9 is positioned above a guard frame 51 as described below.

Further, as shown in FIG. 3, a plurality of bridge frame portions 10 are installed between the pair of upper main frame portions 5 in the body frame 2. The bridge frame portions 10 are arranged so that one thereof is provided in front of the fuel tank 32 on the front side of the saddle-ridden type fuel cell vehicle 1, and the other two are provided behind the fuel tank 32 on the rear side of the saddle-ridden type fuel cell vehicle 1. In addition, a reinforcing bridge frame 11 is installed between the pair of upper main frame portions 5 above the middle portion of the fuel tank 32 in the front and rear direction.

Further, as shown in FIG. 1, a steering shaft 21 is inserted into the head pipe 3 positioned on the front portion of the body frame 2, and a handle 22 is attached on the top of the steering shaft 21. Also, a front fork 23 is attached on the bottom of the steering shaft 21, and a front wheel 24 as a steerable wheel 24 is supported on the front fork 23.

Further, the swingable arm 25 is supported on the swingable arm support portions 9 positioned on the rear portion of the body frame 2. The swingable arm 25 can be swung about a pivot 26. Further, a rear wheel 27 as a driving wheel is supported on the swingable arm 25. In addition, the swingable arm 25 is supported on a rear end side of the upper main frame portions 5 by a rear suspension 28. Also, the swingable arm 25 is provided with a motor 29 for driving the rear wheel 27. Also, a seat 30 is attached on an upper side of the middle portion of the body frame 2 in the front and rear direction. In addition, a fuel cell 31 for supplying an electric power to the motor 29 is provided on an upper side of the rear portion of the body frame 2.

In addition, the fuel tank 32 for storing hydrogen, which is a fuel for the fuel cell 31, is provided on the tank placement portion 8 formed on a lower side of the middle portion of the body frame 2 in the front and rear direction. The fuel tank 32 has a generally cylindrical exterior shape. Also, the fuel tank 32 is arranged on the tank placement portion 8 in a state that an axis X thereof is laid down to extend along the front and rear direction of the vehicle. Meanwhile, the direction of the axis X of the fuel tank 32 is preferably a horizontal direction and also as viewed from the lateral side of the vehicle, preferably extends to be parallel to or coincide with a straight line extending in the front and rear direction and connecting a point, through which a rotational axis of the front wheel 24 passes, with a point, through which a rotational axis of the rear wheel 27 passes.

Further, a tank valve (fuel supply source valve) 33 for controlling supplying of a fuel from the fuel tank 32 to the fuel cell 31 is provided behind the fuel tank 32 on the lower side of the middle portion of the body frame 2 in the front and rear direction. The tank valve 33 is attached on a rear portion of the fuel tank 32. The tank valve 33 is connected with a plurality of pipes, such as a pipe for supplying a fuel to the fuel cell. Also, a secondary battery 34 is provided between the fuel tank 32 and the seat 30 on the middle portion of the body frame 2 in the front and rear direction.

Figure 4:
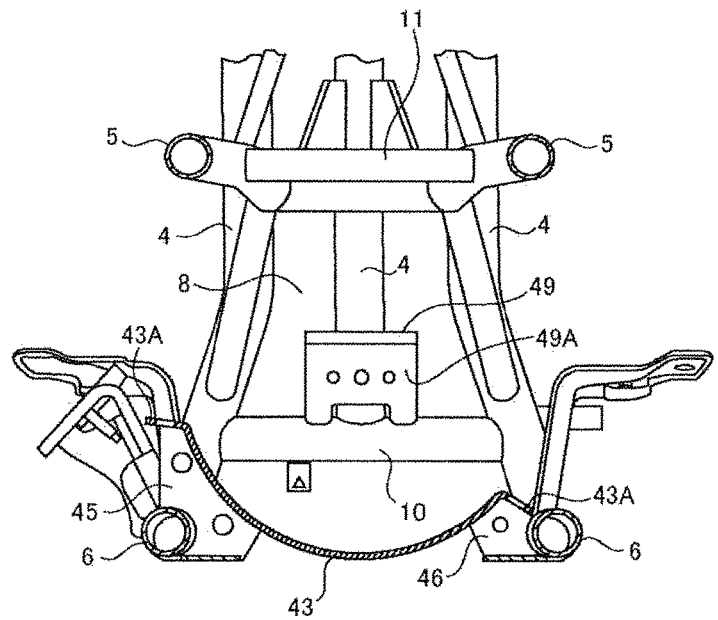
FIG. 4 is a sectional view showing the body frame of the saddle-ridden type fuel cell vehicle according to the embodiment of the present invention, as viewed in an arrow IV-IV direction in FIG. 2.
Figure 5:
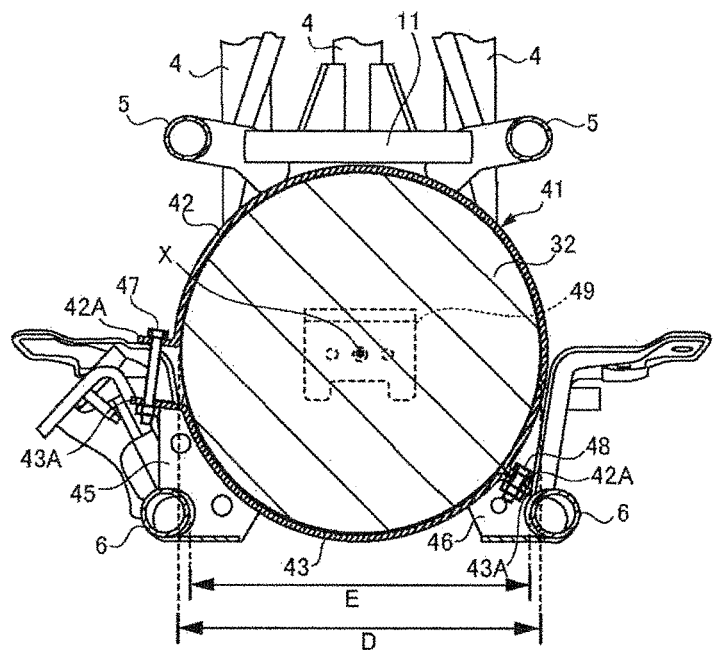
FIG. 5 is a sectional view showing a state where a fuel tank is attached on the body frame of the FIG. 4.
Figure 6:
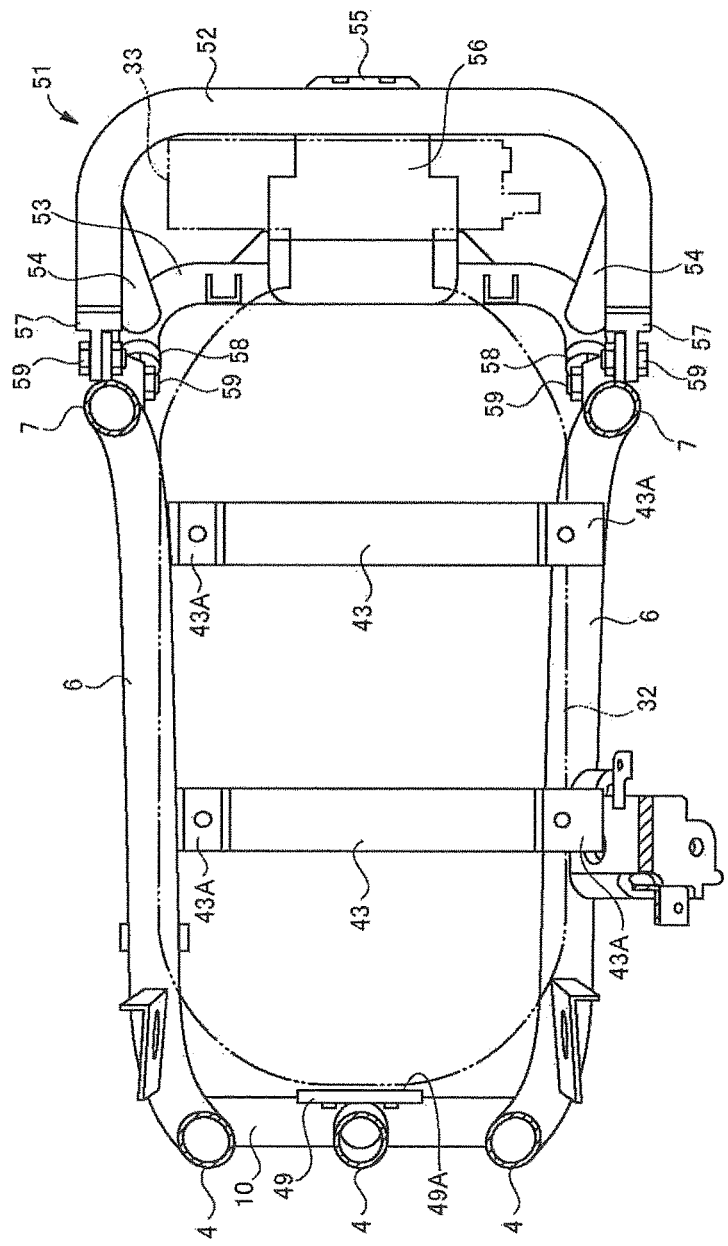
FIG. 6 is a sectional view showing the body frame and the guard frame of the saddle-ridden type fuel cell vehicle according to the embodiment of the present invention, as viewed in an arrow VI-VI direction in FIG. 2.

FIG. 4 is a sectional view showing the body frame 2 as viewed in an arrow IV-IV direction in FIG. 2. FIG. 5 is a sectional view showing a state where the fuel tank 32 is mounted on the body frame 2 of the FIG. 4. FIG. 6 is a sectional view showing the body frame 2 and a guard frame 51 as viewed in an arrow VI-VI direction in FIG. 2.

As shown in FIG. 5, a tank band 41 as a tank support member for supporting the fuel tank 32 on the body frame 2, is provided between the pair of lower main frame portions 6. The tank band 41 is, for example, formed in a ring shape by a metal material and is divided into circular arc-shaped upper and lower band pieces 42 and 43.

A left end portion of the lower band piece 43 is fixed on the lower main frame portions 6 extending in the front and rear direction on the left side of the saddle-ridden type fuel cell vehicle 1 via a band support portion 45. Also, a right end portion of the lower band piece 43 is fixed on the lower main frame portion 6 extending in the front and rear direction on the right side of the saddle-ridden type fuel cell vehicle 1 via a band support portion 46. Further, as shown in FIG. 4, band connection portions 43A, having insertion holes allowing bolts 47 and 48 to be inserted therethrough, are respectively formed on both end portions of the lower band pieces 43.

On the other hand, as shown in FIG. 5, band connection portions 42A having insertion holes allowing the bolts 47 and 48 to be inserted therethrough are also respectively formed on both end portions of the upper band piece 42. The upper band piece 42 is fixed to the lower band piece 43, for example, using the bolts 47 and 48 and nuts as fastener members.

The fuel tank 32 is arranged between the upper band piece 42 and the lower band piece 43 and is fixed on the body frame 2 as the upper band piece 42 is fixed to the lower band piece 43 and then an outer periphery of the fuel tank 32 is encircled and clamped by the upper band piece 42 and the lower band piece 43. Also, as shown in FIG. 6, a plurality of tank bands 41 (e.g., two pieces) are provided to be respectively arranged at different locations in the front and rear direction within a range of the tank placement portion 8 (e.g., on front and rear portions of the take placemen portion 8).

When the fuel tank 32 is fixed on the body frame 2, as shown in FIG. 5, the fuel tank 32 is first placed on the tank placement portion 8. The lower band piece 43 is previously fixed on the lower main frame portions 6, and when the fuel tank 32 is placed on the tank placement portion 8, the fuel tank 32 is rested on the lower band piece 43. Then, the upper band piece 42 is arranged on an upper portion of the fuel tank 32 and thus the fuel tank 32 is sandwiched between the upper band piece 42 and the lower band piece 43. Then, the band connection portion 42A on the right end of the upper band piece 42 and the band connection portion 43A on the right end of the lower band piece 43 are connected and fixed to each other using the bolt 48 and a nut. Then, the band connection portion 42A on the left end of the upper band piece 42 and the band connection portion 43A on the left end of the lower band piece 43 are connected to each other using the bolt 47 and a nut, and then the bolt 47 and the nut are tightened so that the outer periphery of the fuel tank 32 is clamped by the upper band piece 42 and the lower band piece 43. In this way, the fuel tank 32 is fixed on the body frame 2.

Also, because the bolt 47 on the left side is longer than the bolt 48 on the right side, a distance between the band connection portion 42A on the left end of the upper band piece 42 and the band connection portion 43A on the left end of the lower band piece 43 can be adjusted, and thus fuel tanks 32 having different outer peripheral dimensions can be fixed to the body frame 2.

Further, as shown in FIG. 4 or 6, a tank bracket 49 is provided in front of the fuel tank 32 placed on the tank placement portion 8. In front of the fuel tank 32, a bridge frame portion 10 is provided to extend in the right and left direction and to connect lower ends of the plurality of down frame portions 4, and the tank bracket 49 is fixed on the bridge frame portion 10. Specifically, the tank bracket 49 is arranged on a connection portion between the bridge frame portion 10 and the down frame portions 4, which are arranged at the middle in the right and left direction, and is fixed on a rear side of the connection portion. Also, as shown in FIG. 5, the tank bracket 49 is positioned at a position intersecting the axis X of the fuel tank 32 placed on the tank placement portion 8. In the present embodiment, the axis X extends through the center of the tank bracket 49. Further, the tank bracket 49 has a surface 49A widening in a direction perpendicular to the axis X, and the surface 49A opposes the front end portion of the fuel tank 32. As viewed from the front side of the vehicle, an area of the surface 49A is larger than an area of a part of the bridge frame portion 10 opposing the front end portion of the fuel tank 32.

Figure 7:
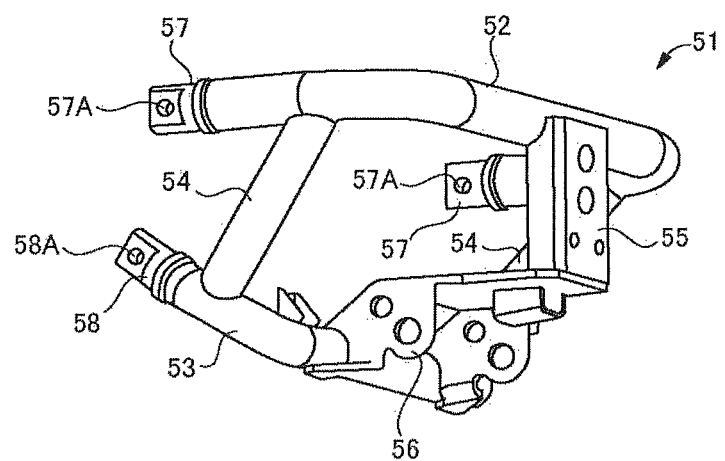
FIG. 7 is an exterior perspective view showing the guard frame of the saddle-ridden type fuel cell vehicle according to the embodiment of the present invention.
Figure 8:
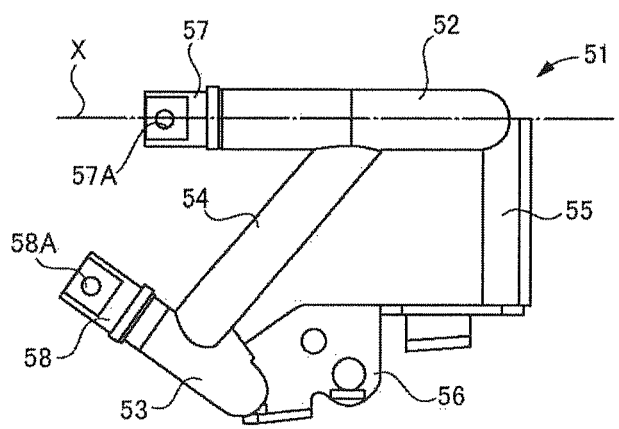
FIG. 8 is an exterior view showing the guard frame of the saddle-ridden type fuel cell vehicle according to the embodiment of the present invention, as viewed from the lateral side.
Figure 9:
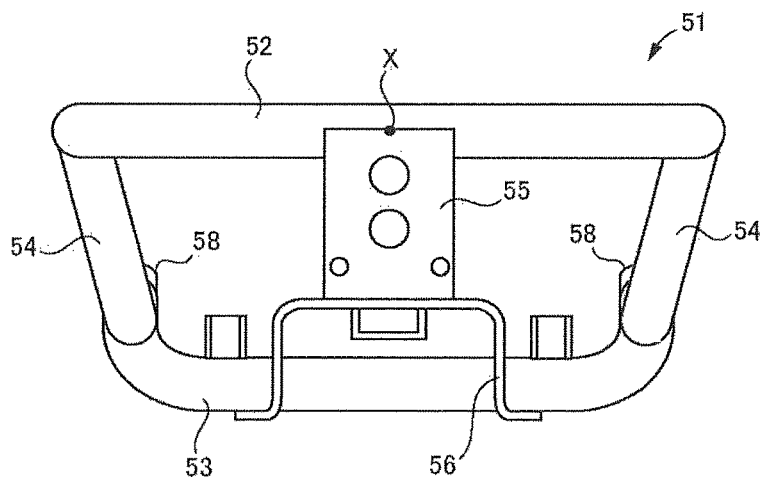
FIG. 9 is an exterior view showing the guard frame of the saddle-ridden type fuel cell vehicle according to the embodiment of the present invention, as viewed from the rear side.

FIGS. 7 to 9 show the guard frame 51. FIG. 7 is a view of the guard frame 51 as viewed obliquely from the rear and lateral side, FIG. 8 is a view of the guard frame 51 as viewed from the lateral side, and FIG. 9 is a view of the guard frame 51 as viewed from the rear side.

As shown in FIG. 51, the guard frame 51 is installed between the pair of up frame portions 7 and covers the fuel tank 32 and the tank valve 33 from the rear side of them. Namely, the rear portion of the fuel tank 32 protrudes more rearward than each up frame portion 7, and the tank valve 33 is attached on the protruded rear portion of the fuel tank 32. The guard frame 51 is configured to cover and encircle the protruded rear portion of the fuel tank 32 and the tank valve 33. As shown in FIG. 7, the guard frame 51 includes an upper guard frame 52, a lower guard frame 53 and connection members (connection pipes 54, a rear connection member 55 and a stand support member 56). The guard frame 51 is a unitary structure, in which the upper guard frame 52 and the lower guard frame 53 are connected with each other by the connection members, and also is independent of the body frame 2.

The upper guard frame 52 is formed in a U-shape, as viewed from the upper side, by a pipe-shaped member made of steel, aluminum alloy or the like. Namely, the middle portion of the upper guard frame 52 extends in the right and left direction of the saddle-ridden type fuel cell vehicle 1 to traverse the rear of the tank valve 33. Also, both end portions of the upper guard frame 52 are bent from the middle portion of the upper guard frame 52 and then respectively extend toward the front side of the saddle-ridden type fuel cell vehicle 1 on right and left sides of the tank valve 33. Further, both end portions of the upper guard frame 52 are respectively provided with guard frame-side attaching portions 57, each of which has an attaching hole 57A allowing a bolt 59 (see FIG. 2) to pass therethrough.

Also, the lower guard frame 53 is positioned below the upper guard frame 52. The lower guard frame 53 is approximately the same as the upper frame portion 52 and thus is formed in a U-shape, as viewed from the upper side, by a pipe-shaped member made of steel, aluminum alloy or the like. As shown in FIG. 8, the middle portion of the lower guard frame 53 is positioned below and in front of the middle portion of the upper guard frame 52 and extends below the tank valve 33 in the right and left direction of the saddle-ridden type fuel cell vehicle 1. Also, both end portions of the lower guard frame 53 are bent from the middle portion of the lower guard frame 53 and then respectively extend toward the front side of the saddle-ridden type fuel cell vehicle 1 to be directed toward right and left sides of the fuel tank 32. Also, a length dimension, in the front and rear direction, of both end portions of the lower guard frame 53 extending forward is smaller than a length dimension, in the front and rear direction, of both end portions of the upper guard frame 52 extending forward. Further, both end portions of the lower guard frame 53 each is inclined to be raised toward the front side of the vehicle, and accordingly, the left end portion of the upper guard frame 52 and the left end portion of the lower frame portion 53 approach each other as they go toward the front side of the vehicle and also the right end portion of the upper guard frame 52 and the right end portion of the lower frame portion 53 approach each other as they go toward the front side of the vehicle. Also, as shown in FIG. 9, both end portions of the lower guard frame 53 are respectively positioned more inside of the vehicle than both end portions of the upper guard frame 52. In addition, as shown in FIG. 8, both end portions of the lower guard frame 53 are respectively provided with guard frame-side attaching portions 58, each of which has an attaching hole 58A allowing a bolt 59 (see FIG. 2) to pass therethrough.

Further, the upper guard frame 52 and the lower guard frame 53 are connected with each other by the connection members, i.e., a pair of connection pipes 54, a rear connection member 55 and a stand support member 56. As shown in FIG. 9, one connection pipe 54 connects the left end portion of the upper guard frame 52 with the left end portion of the lower guard frame 53, and the other connection pipe 54 connects the right end portion of the upper guard frame 52 with the right end portion of the lower guard frame 53. Also, as shown in FIG. 8, each connection pipe 54 extends in a direction perpendicular to an extending direction of the respective end portion of the lower guard frame 53 extending forward while being inclined upward. In addition, the pair of connection pipes 54 extend upward while being inclined rearward on the lateral sides of the rear portion of the fuel tank 32 and the lateral sides of the tank valve 33.

Further, the rear connection member 55 and the stand support member 56 connect the middle portion, in the right and left direction, of the upper guard frame 52 with the middle portion, in the right and left direction, of the lower guard frame 53. Namely, an upper end portion of the rear connection member 55 is connected to the middle portion of the upper guard frame 52, a lower end portion of the rear connection member 55 is connected to an upper portion (rear end) of the stand support member 56, and a lower portion of the stand support member 55 is connected to the lower guard frame 53. Also, the rear connection member 55 extends in the upward and downward direction behind the lower portion of the tank valve 33, the stand support member 56 extends in the front and rear direction below and behind the tank valve 33, and a portion at which the lower end of the rear connection member 55 and the rear end of the stand support member 56 are connected to each other is positioned below and behind the tank valve 33. Meanwhile, the stand support member 56 is a sheet metal member having a hat-shaped cross section opened downward and has a width widening in the right and left direction of the vehicle as it goes from a connection portion thereof to the rear connection member 55 toward the front side, so that a connection width thereof to the lower guard frame 53 is larger than a connection width thereof to the rear connection member 55. In addition, as shown in FIG. 1, a center stand 60 is supported on right and left vertical walls of the stand support member 56 defining a part of the hat-shaped cross section.

Meanwhile, as shown in FIG. 2, each up frame portion 7 of the body frame 2 is provided with an up frame-side attaching portion 61 extending from the middle portion thereof in the upward and downward direction to the lower portion thereof. On each up frame-side attaching portion 61, an attaching hole 61 (see FIG. 13) allowing a bolt 59 to pass therethrough is formed. The guard frame 51 is attached between the pair of up frame portions 7 by connecting the guard frame-side attaching portions 57 and 58, respectively, to the up frame-side attaching portions 61, for example, using bolts 59 and nuts as fastener members.

When the guard frame 51 has been attached between the pair of up frame portions 7, the lateral and rear sides of the tank valve 33 is covered with the upper guard frame 52 and the lower side of the tank valve 33 is covered with the lower guard frame 53, the connection pipes 54, the rear connection member 55 and the stand support member 56. In addition, each pipes connected to the tank valve 33 is also covered with the upper guard frame 52, the lower guard frame 53, the connection pipes 54 and the like.

Also, as shown in FIG. 1, the upper guard frame 52 is positioned to intersect the axis X of the fuel tank 32. Specifically, in the upward and downward direction (i.e., as viewed from the lateral side), a position of the upper guard frame 52 (a position of the center axis of the pipe forming the upper guard frame 52) coincides with a position of the axis X of the fuel tank 32. Also, the axis X extends through the middle, in the right and left direction, of a portion of the upper guard frame 52, which extends in the right and left direction (see FIG. 9). Further, in the upward and downward direction, positions of the guard frame-side attaching portions 57 provided on both end portions of the upper guard frame 52 coincide with the position of the axis X of the fuel tank 32 (see FIG. 1 or 8). Namely, the center axis of the pipe forming the middle portion and both end portions of the upper guard frame 52 are positioned in the same plane as the axis X of the fuel tank 32.

Figure 13:
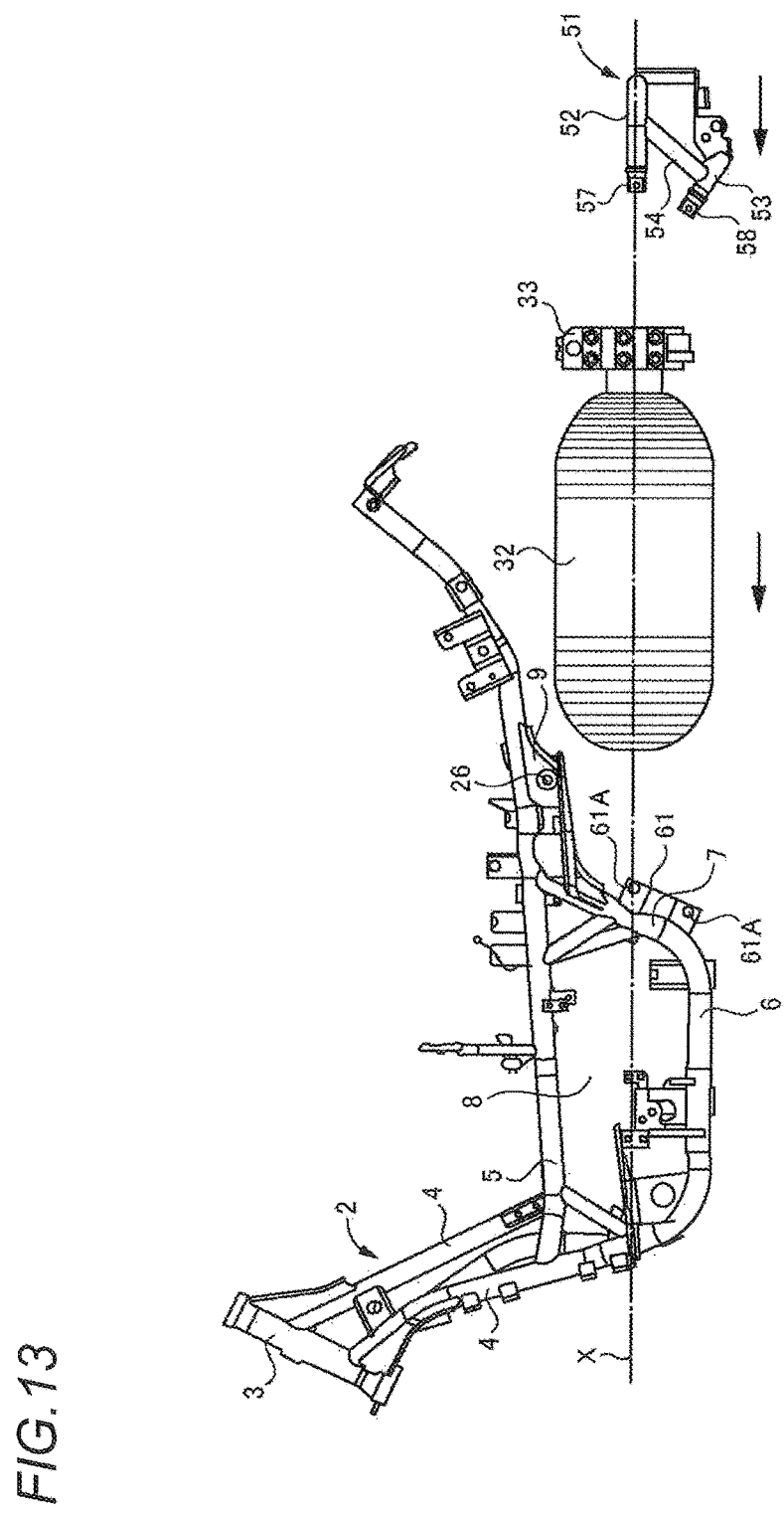
FIG. 13 is an explanatory view showing the body frame, the fuel tank, a tank valve and the guard frame of the saddle fuel cell vehicle of FIG. 1.

FIG. 13 shows a procedure of mounting the fuel tank 32 on the body frame 2. As shown in FIG. 13, when the fuel tank 32 is mounted onto the body frame 2, the fuel tank 32 passes between the pair of up frame-side attaching portions 61 and also between the pair of up frame portions 7 from the rear of the body frame 2, on which the guard frame 51 is not yet attached, toward the front side and then is inserted into the tank placement portion 8 encircled by the pair of upper main frame portions 5 and the pair of lower main frame portions 6 to be rested on the lower band piece 43. Subsequently, as described above, the fuel tank 32 is sandwiched by the upper band piece 42 and the lower band piece 43 and then the respective band connection portions 42A of the upper band piece 42 and the respective band connection portion 43A of the lower band piece 43 are fixed to each other by bolts 47 and 48 and nuts. Subsequently, the guard frame-side attaching portions 57 and 58 of the guard frame 51 are attached on the up frame-side attaching portions 61 of the up frame portion 7.

According to the saddle-ridden type fuel cell vehicle 1 of the embodiment of the present invention configured as described above, protection of the fuel tank 32 and the tank valve 33 upon a frontal or rear-end collision can be enhanced as described below.

Figure 10:
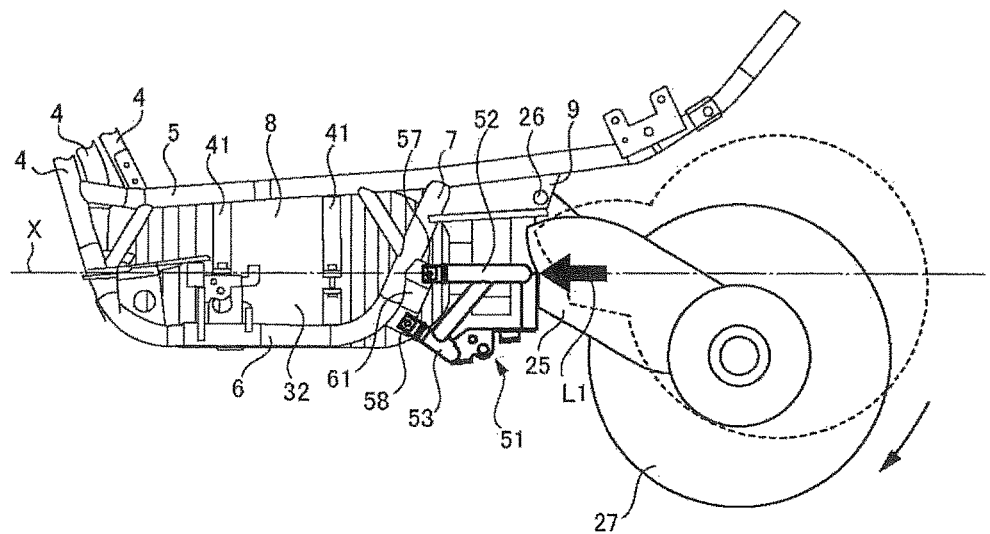
FIG. 10 is an explanatory view showing a state where a swingable arm hits against the guard frame upon a frontal or rear-end collision of the saddle-ridden type fuel cell vehicle of the embodiment of the present invention.

In other words, when the saddle-ridden type fuel cell vehicle 1 collides against an object at the front side thereof or when an object collides against the rear side of the saddle-ridden type fuel cell vehicle 1, the swingable arm 25 together with the rear wheel 27 is likely to be excessively swung forward about the pivot 26 to exceed a normal swing range due to a force occurring due to collision. Herein, FIG. 10 shows such a situation. In FIG. 10, positions of the swingable arm 25 and the rear wheel 27 in a normal state are shown by a dotted line, and positions of the swingable arm 25 and the rear wheel 27 excessively swung forward to exceed the normal swing range due to a frontal or rear-end collision are shown by a solid line.

If the swingable arm 25 or the rear wheel 27 is excessively swung forward due to the frontal or rear-end collision, for example, as shown in FIG. 10, the swingable arm 25 is moved forward toward the tank valve 33. However, at this time, the swingable arm 25 hits against the upper guard frame 52 of the guard frame 51 so that movement of the swingable arm 25 is blocked. As a result, the swingable arm 25 does not directly hit against the tank valve 33. Also, an impact load exerted on the upper guard frame 52 is transferred from the up frame-side attaching portions 61 to the up frame portions 7 (body frame 2), but is not transferred to the tank valve 33. In this way, the upper guard frame 52 can prevent the swingable arm 25 or the rear wheel 27 from directly hitting against the tank valve 33 upon the frontal or rear-end collision, thereby enhancing protection of the tank valve 33.

Also, for example, when the frontal or rear-end collision is very severe, the swingable arm 25 or the rear wheel 27 very intensively hits against the upper guard frame 52. Accordingly, it is considered that the upper guard frame 52 is displaced forward and thus the upper guard frame 52 hits against the rear portion of the tank valve 33 so that a load is exerted onto the fuel tank 32 via the tank valve 33.

Figure 11:
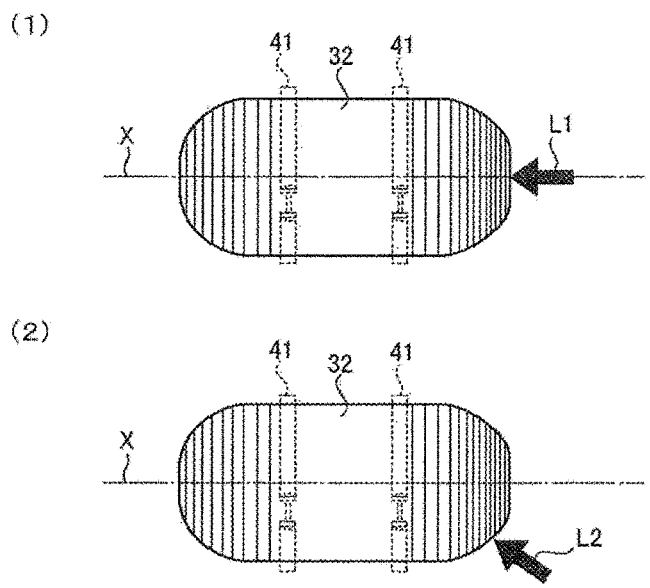
FIG. 11 is an explanatory view showing a direction of a load exerted on the fuel tank.

In this case, because the upper guard frame 52 is positioned to intersect the axis X of the fuel tank 32, a direction of the load exerted on the rear portion of the fuel tank 32 often becomes a direction along the axis X of the fuel tank 32. In FIG. 10, an arrow L1 represents such a direction of the load. Herein, due to a generally cylindrical exterior shape and the like, the fuel tank 32 is hardly deformed in a case where the load is exerted thereon in the direction L1 along the axis X as shown in (1) of FIG. 11, as compared with a case where the load is exerted in a direction L2 intersecting the axis X as shown in (2) of FIG. 11. Thus, when the swingable arm 25 or the rear wheel 27 is very intensively hid against the upper guard frame 52, and as a result a load is exerted on the rear portion of the fuel tank 32 via the upper guard frame 52 and the tank valve 33, the fuel tank 32 can receive the load and thus be inhibited from being deformed. In this way, because the upper guard frame 52 is positioned to intersect the axis X of the fuel tank 32, protection of the fuel tank 32 can be enhanced.

Also, because the upper guard frame 52 is formed in a U shape as shown in FIG. 7, the lateral sides of the tank valve 33 and pipes connected to the tank valve 33 as well as the rear side of the tank valve 33 can be protected.

Further, the lower guard frame 53, the rear connection member 55 or the stand support member 56 can prevent a stone bounced from a road surface or a protrusion on an uneven road during running from directly hitting against the tank valve 33, thereby enhancing protection of the tank valve 33.

Further, in the saddle-ridden type fuel cell vehicle 1, as shown in FIG. 5, the tank bracket 49 in the front of the fuel tank 32 is positioned at a position intersecting the axis X of the fuel tank 32. Accordingly, it is possible to cause a direction of a load exerted on the fuel tank 32 from the front side upon a frontal or rear-end collision to coincide with the direction of the axis X of the fuel tank 32. In addition, a pressure of a local impact load on the fuel tank 32 upon a frontal or rear-end collision can be alleviated due to the tank bracket 49.

Further, in the saddle-ridden type fuel cell vehicle 1, the tank band 41 for supporting the fuel tank 32 on the body frame 2 is configured to be fixed on only the lower main frame portion 6. In other words, because the tank band 41 is not configured to be fixed on both of the lower main frame portions 6 and upper main frame portions 5, the tank band 41 can be inhibited from being deformed, even if the upper main frame portions 5 are displaced relative to the lower main frame portions 6 due to a force occurring due to a frontal or rear-end collision. Thus, the fuel tank 32 can be inhibited from being deformed due to deformation of the tank band 41.

Figure 12:
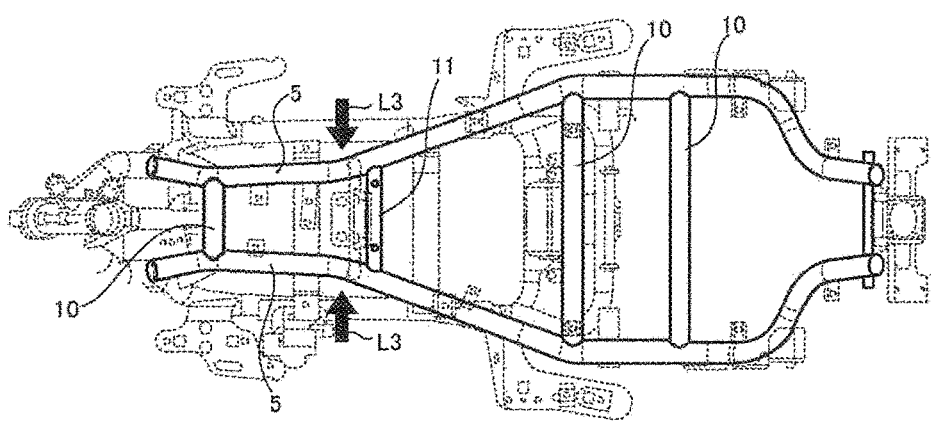
FIG. 12 is an explanatory view showing a state where a load is exerted on upper main frame portions in the saddle-ridden type fuel cell vehicle according to the embodiment of the present invention.

Further, in the saddle-ridden type fuel cell vehicle 1, because the reinforcing bridge frame 11 is installed between the pair of upper main frame portions 5 above the middle portion of the fuel tank 32 in the front and rear direction as shown in FIG. 12, the upper main frame portions 5 can be inhibited from being deformed, for example, in directions as shown by arrows in FIG. 12, upon a frontal or rear-end collision, and thus it is possible to prevent an excessive load from being exerted on the fuel tank 32 due to deformation of the upper main frame portion 5.

In other words, in order to achieve enhancement of comfort of a passenger, a distance between the pair of upper main frame portions 5 needs to be narrowed, and accordingly, each of the upper main frame portions 32 is bent above the fuel tank 32. Therefore, when the reinforcing bridge frame 11 does not exist, the bent portions of the upper main frame portions 5 have a strength lower than the other portions. Thus, upon a frontal or rear-end collision, it is considered that the bent portions of the upper main frame portions 5 are deformed inward and downward as shown by arrows in FIG. 12. If the upper main frame portions 5 are deformed above the middle portion, in the front and rear direction, of the fuel tank 32 in such a manner, it is considered that the deformed portions of the upper main frame portions 5 or other portions of the body frame 2 deformed due to deformation of the upper main frame portions 5 hit against the fuel tank 32 and thus an excessive load is exerted on the fuel tank 32. However, because the reinforcing bridge frame 11 is installed on the bent portions of the upper frame portions 5 or on the vicinity thereof, deformation of the upper man frame portions 5 upon collision can be inhibited and thus it is possible to prevent a load from being exerted on the fuel tank 32.

Meanwhile, according to the saddle-ridden type fuel cell vehicle 1 of the embodiment of the present invention, a diameter of the fuel tank 32 can be increased as described below, thereby increasing a capacity of the fuel tank 32. Namely, as shown in FIG. 7, the guard frame 51 is a structure independent of the body frame 2 and is attached on the body frame 2, for example, using fastener members such as bolts 59 and nuts (see FIG. 2). Accordingly, in a step prior to mounting the fuel tank 32 into the tank placement portion 8, the guard frame 51 is left separated from the body frame 2 and then after mounting the fuel tank 32 into the tank placement portion 8, the guard frame 51 can be attached onto the body frame 2.

Specifically, in a state where the guard frame 51 is not yet attached on the body frame 2, an opening portion allowing the fuel tank 32 to pass therethrough is formed behind the tank placement portion 8 in the body frame 2. Thus, as shown in FIG. 13, in the state where the guard frame 51 is not yet attached on the body frame 2, the fuel tank 32 can be mounted into the tank placement portion 8 from the rear thereof.

Because the fuel tank 32 can be mounted into the tank placement portion 8 from the rear thereof, it is not necessary to cause the fuel tank 32 to pass between the pair of lower main frame portions 6, between the pair of upper main frame portions 5, between the upper main frame portion 5 and the lower main frame portion 6 arranged on the left side or between the upper main frame portion 5 and the lower main frame portion 6 arranged on the right side, in order to mount the fuel tank 32 into the tank placement portion 8. Thus, a diameter of the fuel tank 32 (when members such as brackets have been attached to the fuel tank 32, a diameter of the entire structure including the fuel tank 32 and the members such as brackets) can be set to be larger than a dimension in the right and left direction of a space defined between the pair of lower main frame portions 6 at a location corresponding to the tank placement portion 8, a dimension in the right and left direction of a space defined between the pair of upper main frame portions 5 at a location corresponding to the tank placement portion 8, a dimension in the upward and downward direction of a space defined between the upper main frame portion 5 and the lower main frame portion 6 arranged on the left side at a location corresponding to the tank placement portion 8, or a dimension in the upward and downward direction of a space defined between the upper main frame portion 5 and the lower main frame portion 6 arranged on the right side at a location corresponding to the tank placement portion 8. As a result, a volume of the fuel tank 32 can be increased and thus a capacity of the fuel tank 32 can be increased. In the present embodiment, as shown in FIG. 5, the diameter D of the fuel tank 32 is larger than the dimension E in the right and left direction of the space between the pair of the lower main frame portions 6.

Further, in the saddle-ridden type fuel cell vehicle 1 according to the embodiment of the present invention, the guard frame 51 is a unitary structure in which the upper guard frame 52 and the lower guard frame 53 are connected to each other by the connection pipes 54 and the like. Thus, when the fuel tank 32 is mounted onto the body frame 2, a structure of covering the fuel tank 32 and the tank valve 33 on the rear side thereof and also covering the tank valve 33 on the lower side thereof can be easily realized by only attaching the guard frame 51, which is the unitary structure, on the up frame portions 7 after mounting the fuel tank 32 in the tank placement portion 8.

Meanwhile, although in the forgoing embodiments, the case where the guard frame 51 is the unitary structure obtained by connecting the upper guard frame 52 and the lower guard frame 53 to each other by the connection pipes 54 and the like has been described by way of example, the preset invention is not limited to that. A configuration in which the upper guard frame 52 and the lower guard frame 53 are provided as separate members and thus are individually attached onto the up frame portions 7 may be employed.

Also, the present invention may be applied to any other fuel cell vehicles, in which a fuel tank is arranged below the middle portion, in a front and rear direction, of the vehicles in a state that an axis X thereof is laid down to extend along the front and rear direction, other than scooter-type automatic two-wheeled vehicles.

In addition, the present invention can be appropriately modified without departing from the scope and spirit of the invention which can be read from the appended claims and the entire specification, and thus saddle-ridden type fuel cell vehicles involving such modifications are also intended to be encompassed by the technical spirit of the present invention.

What is claimed is:

1. A saddle-ridden fuel cell vehicle, comprising a body frame; a steerable wheel provided on a front portion of the body frame; a driving wheel provided on a rear portion of the body frame via a swingable arm; a motor provided on the swingable arm to drive the driving wheel; a fuel cell provided on the body frame to supply an electric power to the motor; a fuel tank having a generally cylindrical exterior shape and provided below a middle portion of the body frame in a front and rear direction of the saddle-ridden fuel cell vehicle to store a fuel for the fuel cell; and a tank valve provided behind the fuel tank below the middle portion of the body frame in the front and rear direction to control supplying of the fuel from the fuel tank to the fuel cell, wherein the body frame comprises:
a head pipe positioned on a front portion of the saddle-ridden fuel cell vehicle and configured to support the steerable wheel;
a down frame portion extending downward from the head pipe;
a pair of right and left upper main frame portions extending in a front and rear direction from a portion of the down frame portion, the portion of the down frame portion located at approximately a middle of the down frame portion relative to an upward and downward direction, to a rear portion of the saddle-ridden fuel cell vehicle;
a pair of right and left lower main frame portions extending in the front and rear direction from a lower portion of the down frame portion to a middle portion of the saddle-ridden fuel cell vehicle in the front and rear direction; and
up frame portions respectively extending upward from rear end portions of the pair of lower main frame portions and respectively connected to the pair of upper main frame portions at upper end portions of the up frame portions;
wherein a tank placement portion is formed in a region encircled by the pair of upper main frame portions and the pair of lower main frame portions in the middle portion of the body frame in the front and rear direction, and the fuel tank is placed on the tank placement portion so that an axis of the fuel tank extends in the front and rear direction;
wherein a guard frame is installed between the up frame portions to traverse a rear of the tank valve in a right and left direction;
wherein the guard frame is formed as a member independent of the body frame;
wherein guard frame-side attaching portions for removably attaching the guard frame on the pair of up frame portions are provided on end portions of the guard frame;
wherein each of the up frame portions is provided with an up frame-side attaching portion, on which the respective guard frame-side attaching portions of the guard frame are to be removably attached; and
wherein each of the guard frame-side attaching portions is fixed to the respective up frame-side attaching portion by a fastener member.

2. The saddle-ridden fuel cell vehicle according to claim 1,
wherein the guard frame comprises:
an upper guard frame extending between the pair of up frame portions in the right and left direction and intersecting the axis of the fuel tank;
a lower guard frame positioned below the upper guard frame and extending between the pair of up frame portions in the right and left direction; and
a connection member for connecting the upper guard frame and the lower guard frame to each other, and
wherein the guard frame-side attaching portions are respectively provided on end portions of the upper guard frame and on both-end portions of the lower guard frame.

3. The saddle-ridden fuel cell vehicle according to claim 1, wherein the upper guard frame is formed in a generally U shape as viewed from an upper side thereof, and at least the tank valve is arranged inside of the upper guard frame.

4. The saddle-ridden fuel cell vehicle according to claim 1, further comprising a band-shaped tank support member for supporting the fuel tank on the body frame by clamping an outer periphery of the fuel tank,
wherein the tank support member is fixed to only the lower main frame portions.

5. The saddle-ridden fuel cell vehicle according to claim 1, wherein a reinforcing bridge frame is installed between the pair of upper main frame portions above a middle portion of the fuel tank in the front and rear direction.

6. A saddle-ridden fuel cell vehicle, comprising a body frame; a steerable wheel provided on a front portion of the body frame; a driving wheel provided on a rear portion of the body frame via a swingable arm; a motor provided on the swingable arm to drive the driving wheel; a fuel cell provided on the body frame to supply an electric power to the motor; a fuel tank having a generally cylindrical exterior shape and provided below a middle portion of the body frame in a front and rear direction of the saddle-ridden fuel cell vehicle to store a fuel for the fuel cell; and a tank valve provided behind the fuel tank below the middle portion of the body frame in the front and rear direction to control supplying of the fuel from the fuel tank to the fuel cell, wherein the body frame comprises:
a head pipe positioned on a front portion of the saddle-ridden fuel cell vehicle and configured to support the steerable wheel;
a down frame portion extending downward from the head pipe;
a pair of right and left upper main frame portions extending in a front and rear direction from a portion of the down frame portion, the portion of the down frame portion located at approximately a middle of the down frame portion relative to an upward and downward direction, to a rear portion of the saddle-ridden fuel cell vehicle;
a pair of right and left lower main frame portions extending in the front and rear direction from a lower portion of the down frame portion to a middle portion of the saddle-ridden fuel cell vehicle in the front and rear direction; and
up frame portions respectively extending upward from rear end portions of the pair of lower main frame portions and respectively connected to the pair of upper main frame portions at upper end portions of the up frame portions;
wherein a tank placement portion is formed in a region encircled by the pair of upper main frame portions and the pair of lower main frame portions in the middle portion of the body frame in the front and rear direction, and the fuel tank is placed on the tank placement portion so that an axis of the fuel tank extends in the front and rear direction;

wherein a guard frame is installed between the up frame portions to traverse a rear of the tank valve in a right and left direction;

wherein a bridge frame is provided on a lower end portion of the down frame portion to traverse a front of the fuel tank, wherein a tank bracket opposing a front end portion of the fuel tank is fixed on the bridge frame, and wherein the tank bracket is positioned at a location intersecting the axis of the fuel tank.

* * * * *